Jan. 4, 1938.  P. McJUNKIN  2,104,163
GREASE TESTING MACHINE
Filed Nov. 1, 1934  6 Sheets-Sheet 1

INVENTOR-
Paul McJunkin
BY R. J. Dearborn
his ATTORNEY-

Jan. 4, 1938.  P. McJUNKIN  2,104,163
GREASE TESTING MACHINE
Filed Nov. 1, 1934  6 Sheets-Sheet 2

INVENTOR-
Paul McJunkin
BY R. J. Dearborn
his ATTORNEY-

Jan. 4, 1938. P. McJUNKIN 2,104,163
GREASE TESTING MACHINE
Filed Nov. 1, 1934 6 Sheets-Sheet 4

INVENTOR-
Paul McJunkin
BY R. J. Dearborn
his ATTORNEY-

Patented Jan. 4, 1938

2,104,163

UNITED STATES PATENT OFFICE 2,104,163

GREASE TESTING MACHINE

Paul McJunkin, Wrightsville, Pa., assignor to The Texas Company, New York, N. Y., a corporation of Delaware Application November 1, 1934, Serial No. 750,924

14 Claims. (Cl. 265—11)

This invention relates to apparatus for testing plastic materials and more particularly to a device for testing properties of greases under conditions closely simulating those which would be present in actual service.

The principal object of the invention is to provide a machine or apparatus of this type which will be reasonably simple in operation and in which provision is made for carrying out tests to determine various qualities and properties of plastic materials such as greases, while maintaining accurate control over the variables which would tend to affect the material in actual service. The apparatus has been designed particularly for the testing of driving journal lubricants, i. e., greases used in lubricating the driving journals of locomotives.

In driving journal lubrication it is customary to have a cake of grease forced toward and against the drive shaft by means of a suitable compression spring. A perforated metal plate is mounted next to the shaft and the grease is forced by the compression spring through the perforations in the plate into contact with the shaft.

It is often desirable to determine just what changes a grease undergoes in the lubricator or grease box of a driving journal. For instance, a very soft grease, when placed in the grease box would necessarily feed through the perforated plate too rapidly when the bearing becomes heated in service, since the compression spring would be relatively too strong. On the other hand, a hard grease would not be fed out too rapidly unless it had a very low softening point, in which case it would show satisfactory consumption at low temperatures, but too high a consumption when the temperature reached the softening point of the grease. An ideal lubricant, therefore, would be one which would maintain its consistency over a wide temperature range.

Actual tests of greases on locomotives in regular operation would naturally furnish the desired data, but such tests are obviously impracticable and out of the question. The present apparatus has been provided, therefore, to give definite information as to the exact behavior of different greases when used under conditions substantially the same as those in actual service in driving journal lubrication.

In carrying out the invention, a machine has been provided in which the grease sample contained in a small cup is mounted on a platform in a chamber, the temperature of which may be controlled so as either to be maintained at a predetermined fixed point or to be increased or decreased uniformly at a definite rate. A perforated plate or plunger is arranged in the chamber so that it may exert a predetermined pressure on the grease in the cup, the rate of entry of the perforated plate and hence the amount of grease fed being recorded or so that the perforated plate may be advanced at a uniform rate into and through the grease and the pressure required under changing conditions of temperature recorded. The platform is connected to a very accurate scale mechanism so that the pressure being exerted on the grease by the plunger may be measured continuously. In other words the scale will measure the resistance to the entry of the plunger in the grease. Recording apparatus is provided for recording on uniformly moving charts the scale readings as well as the temperature readings in the grease chamber. Through the use of the machine it is also possible to study the relation of temperature, consistency and rate of feed of the grease. A typical test is as follows:

A sample of the grease is cut directly from the cake or lump without disturbing the conditions of the grease or giving it any extra "working". This applies both to pressed greases and to unpressed greases so that the test is made upon the grease in the condition in which it is received. This block of grease contained within four metal walls is of the exact horizontal dimensions to correspond with an "element" of the standard driving journal perforated plate. The upper surface of the block of grease is then subjected to pressure by the even and regular depression of a perforated steel plate or plunger of the same thickness and having perforations identical to those in the standard perforated plate used in driving journal grease boxes. The peripheral edges of the plunger plate are beveled since this substantially eliminates the element of side friction and leaves only the resistance of the grease passing through the holes. The rate of depression of the plunger may be substantially that of the average consumption of the grease in actual service.

During application of this pressure, the block of grease in its container is supported upon a small scale-platform so connected as to automatically indicate and record at all times the pressure required to compel the grease to squeeze through the holes of the plunger. This mechanism is enclosed in a cooling or heating chamber automatically controlled so that the temperature rises steadily at the rate of one degree Fahrenheit per minute. The room temperature and the temperatures of the chamber and of the grease itself are observed from time to time by suitable pyrometers. This test will be referred to hereinafter as the "constant rate of entry" test.

The apparatus is also capable of being utilized to conduct other tests. For instance, the temperature in the grease chamber may be caused to rise at a uniform rate while a predetermined pressure is constantly maintained between the perforated plunger and the grease. This may be called the "constant pressure-increasing temperature" test. Again, a "constant temperature-maximum initial pressure" test may be made by maintaining the grease chamber temperature constant while a maximum pressure is initially placed on the plunger, the grease being allowed to flow through the plunger while the pressure decreases accordingly until that pressure is reached at which the grease ceases to flow. Still other tests such, for instance, as "constant temperature-constant rate of entry" may be run to determine further desired characteristics.

For a better understanding of my invention reference may be had to the accompanying drawings in which.

Figures 1, 11:
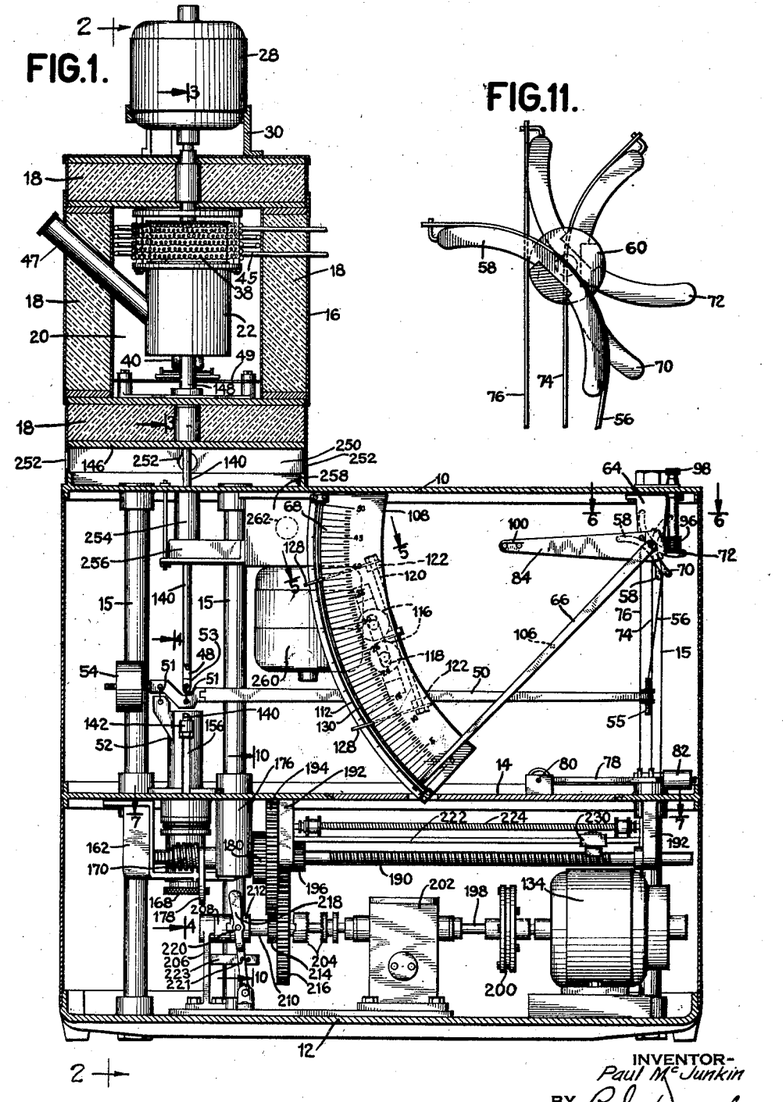
Figure 1 is a vertical elevation partly in section of the grease testing machine, taken on line 1—1 of Figure 2.
Figure 11 is a vertical sectional elevation of the cams in the pressure indicating mechanism taken on line 11—11 of Figure 6.

Referring to the drawings and particularly to Figure 1, the apparatus is shown as being enclosed for the most part in a casing 10 which may be of metal or some other suitable material and which is provided with a base 12 and a horizontal partition 14 which serves to divide the case into two parts. A plurality of vertical posts 15 serve to support the upper wall of the casing as well as the partition 14.

Heating chamber

Mounted on the top of the casing 10 is a smaller casing 16 the walls of which are preferably formed of sheet metal with the space between the metal sheets filled with a suitable heat insulating material 18. The heat resisting walls of the casing 16 provide a heating chamber or oven 20 and provisions are made for maintaining the temperature in this chamber at any predetermined degree or for increasing or decreasing the temperature uniformly as desired.

Figures 2, 3:
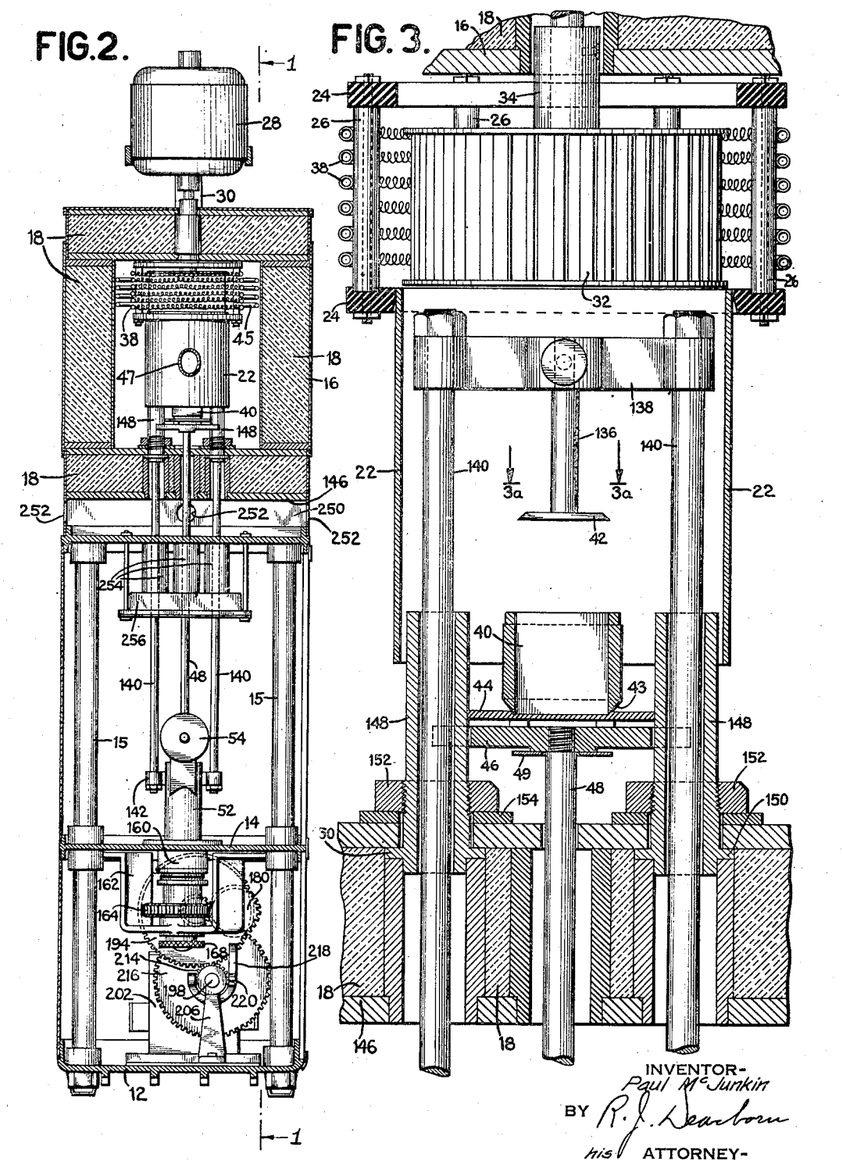
Figure 2 is an end elevation of the grease testing machine partly in section and taken on line 2—2 of Figure 1.
Figure 3 is a vertical section of the grease chamber on line 3—3 of Figure 1.

Supported within the chamber 20 is a cylindrical member 22 shown more clearly in Figure 3 of the drawings. The cylinder 22 is supported from the upper wall of the casing 16 by a pair of annular rings 24, these rings being connected by a plurality of heat resisting rods or posts 26. The upper ring 24 is suitably bolted to the upper wall of the casing 16 and the cylinder 22 is connected to and depends from the lower ring 24.

As is shown in Figure 1 an electric motor 28 is supported on the top of the casing 16 by means of suitable brackets 30. The shaft of the motor 28 extends downwardly through the upper wall of the casing 16 and at the lower end of the motor shaft is attached a fan 32 having a hub 34. An electrical resistance element 38 is wound in a spiral around the heat resisting posts 26 and this heating element comprises the means for maintaining the temperature within the chamber 20 either at a constant point or for varying the temperature at any predetermined rate.

Within the chamber 20 and partially surrounded and protected by the cylinder 22 are mounted the grease container or cup 40 and a perforated plate or plunger 42 which is adapted to enter and pass through the grease in the container as will be explained in detail hereinafter. The plunger plate 42 is provided with a beveled outer edge as will be observed with reference to Figure 3, the purpose of this being to reduce to an absolute minimum any friction between the plunger plate and the inner walls of the grease container 40. The size and arrangement of the perforations in the plunger 42 are the same as those in a section of the standard perforated plate used in driving journal lubrication and the area of the holes bear the same ratio to the area of the plunger as the area of the holes in the standard plate bear to the area of that plate.

The grease container which is square in cross section is provided with a sharpened or beveled lower edge 43 and is supported upon a plate 44 mounted in turn upon another plate 46. Through the provision of the beveled lower edge 43 on the grease cup 40, it is possible to cut a block of grease directly from a sample without disturbing the conditions of the grease in any manner. The plate 46 is secured at its center to the upper end of a rod 48 which rod extends downwardly through the heat insulated lower wall of the casing 16 and the top of the casing 10.

In case it is desired to reduce the temperature of the chamber 20 below room temperature, means are provided in the form of a coil of tubing 45 which may be cooled by circulating therethrough a refrigerating medium such as cold brine or cold carbon dioxide gas derived from liquid $CO_2$. As is shown in Figures 1 and 2 the coil 45 is mounted in the upper portion of the chamber 20 opposite the electrical heating element 38. The flow of the refrigerating medium may be controlled in any suitable way such as by thermostats, not shown, in a manner similar to the control of the electrical resistance heater 38, which control will be described hereinafter. Cold tests may thus be made on greases intended to be used on refrigerating machinery or for winter temperatures.

The rotation of the fan 32 will cause the air to be blown outwardly past the heating element 38 or the cooling coil 45, and this air after passing downwardly within the chamber 20 will pass around the grease cup 40 returning upwardly within the cylinder 22 to the fan 32. Through this arrangement the air within the chamber 20 will be kept constantly in circulation and the temperatures at all points within the chamber will be substantially the same and the temperature of the grease in the cup 40 will vary directly in accordance with the amount of heat emitted from the resistance element 38 or absorbed by the cooling coil 45.

As will be observed with reference to Figure 1, a tube 47 extending outwardly from the cylinder 22 to a point outside of the casing 16 and provided near its outer end with a glass window, not shown, serves to permit visual inspection of the grease in the cup 40 while a test is being conducted. In order to prevent any sidewise movement of the grease cup 40, a thin metallic strip or band 49 secured at its center to the upper end of the rod 48 is attached at its ends to a pair of posts secured to the lower wall of the chamber 20. Due to the flexibility of the strip 49 the upward and downward motion of the grease cup 40 will not be interfered with while at the same time any tendency of the cup to move sidewise will be prevented.

*Pressure indicating mechanism*

Arranged substantially horizontally within the casing 10 is a scale beam 50 which is pivotally supported by means of a spring clip 51 at one end on a bracket 52 mounted on the partition 14. The spring clip 51 consists of a short strip of spring metal having lugs attached to its ends, the lugs fitting in suitable openings in the scale beam 50 and the bracket 52. The lower end of the rod 48 is enlarged as at 53 and is also pivotally attached by means of a similar spring clip (shown in Figures 1 and 4) to the scale beam 50 at a point near the left hand end of the beam as viewed in Figure 1. A counter weight 54 is adjustably mounted by means of a threaded connection on the left hand end of the beam 50.

Figures 3A, 4, 5, 6:
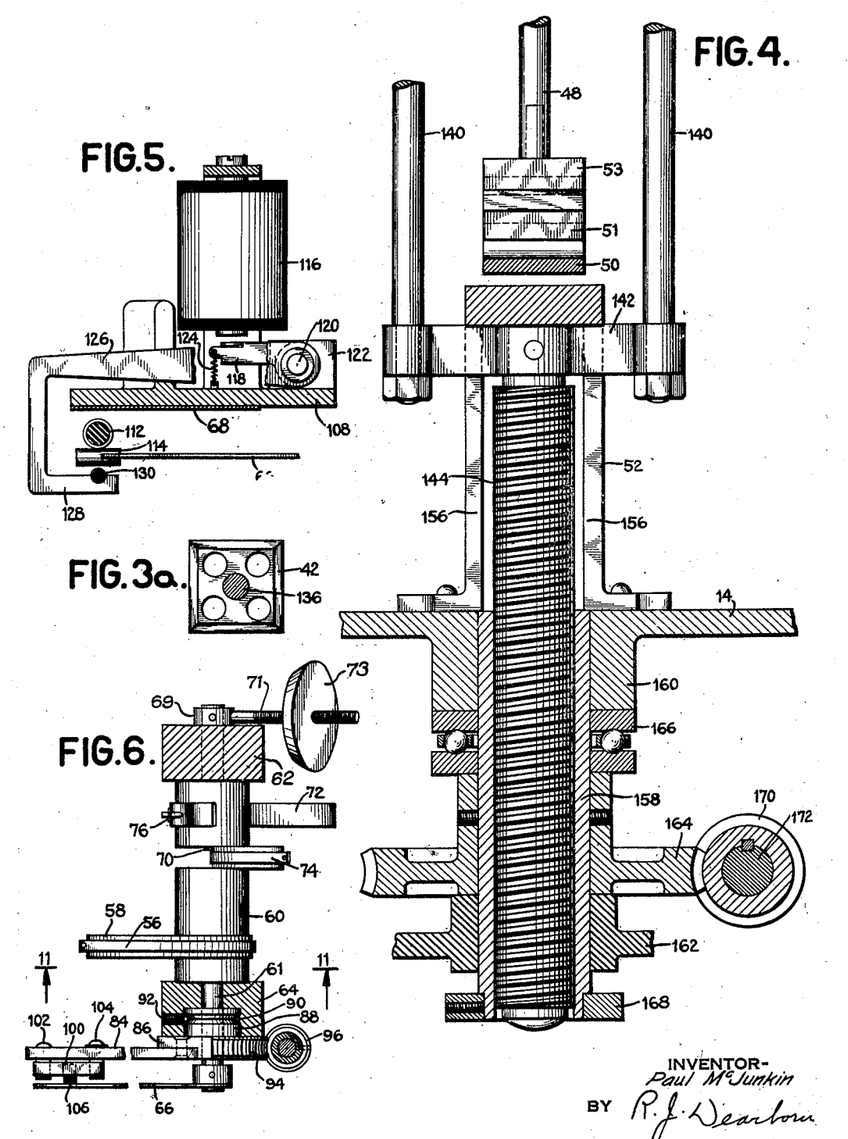
Figure 3a is a view of the perforated plunger plate taken on line 3a—3a of Figure 3.
Figure 4 is a vertical section of a portion of the driving mechanism on line 4—4 of Figure 1.
Figure 5 is a view partly in section of the resistance contacting mechanism taken on line 5—5 of Figure 1.
Figure 6 is a view partly in section of the cams in the pressure indicating mechanism taken on line 6—6 of Figure 1.

The outer or right hand end of the scale beam 50 is provided with an adjusting screw 55 and to the upper end of the screw 55 is attached a flexible strip 56 extending upwardly and around an arc-shaped cam 58 shown more clearly in Figures 6 and 11. The upper end of the strip 56 is secured to one end of the cam 58. The cam 58 is secured to a cam shaft 60 which shaft is mounted between and pivotally supported by brackets 62 and 64 which brackets are secured to the underside of the upper wall of the casing 10, as shown in Figure 1. At one end of the cam shaft 60 is secured a pointer 66 which cooperates with the scale 68 to be described in detail hereinafter. Affixed to one end of the cam shaft 60 is a collar 69 and secured to this collar is a threaded rod 71 projecting radially and in parallel alignment with the pointer 66. A suitable weight 73 is threaded on the rod 71, this weight serving as a counterbalance for the weight of the pointer 66. The weight 73 is adjustable longitudinally of the rod 71 and the collar 69 can be rotatably adjusted on the shaft 60 and locked by means of a suitable set screw. It can be seen, therefore, that through this arrangement the pointer 66 can be counterbalanced very accurately.

The cam shaft 60 has attached thereto two other arc-shaped cams 70 and 72 similar in contour to the cam 58, these cams being arranged substantially at 45° to each other. At the upper ends of the cams 70 and 72 are attached flexible strips 74 and 76 respectively. The strips 74 and 76 extend downwardly and each is secured to one of a pair of levers 78 pivotally mounted as at 80 on the partition 14. A weight 82 is threaded on the outer end of each lever 78 and can be adjusted toward or away from the pivot 80 to vary the tension in the strips 74 and 76. Only one of the levers 78 and one weight 82 are shown in Figure 1 of the drawings but it is to be understood that the other weight and lever are located directly in back of the one shown. It is necessary to have some slight tension on the strip 56 and this is accomplished by the action of the weight attached to the strip 76. In adjusting the machine the weight of the beam 50 is partly counterbalanced by the weight 82 attached to the strip 76 and partly by the counterweight 54. Therefore, that part of the weight of the beam 50 which is balanced by the weight 82 attached to the strip 76 must be compensated by applying the last mentioned weight to the cam 72 which is exactly similar to but 180° opposed to, cam 58. The function of the cam 70 and weight 82 acting through the strip 74 is to balance the pressure applied to the grease by the plate or plunger 42 and transmitted to the beam 50 through the rod 48 and link 51.

Through the use of the series of cams having the particular shape and arrangement shown in Figures 1 and 6, readings on the scale 68 may be obtained which will be very accurate on the small values at the lower end of the scale and at the same time accurate to the same degree on the larger values on the same scale. For instance, at the lower portion of the scale the pointer 66 may be moved two millimeters by a change in weight or pressure on the grease in the cup 42 of one gram' while in the upper portion of the scale the same distance may correspond to a change in weight or pressure of one kilogram. It is thus possible to determine a pressure through a very wide range with approximately equal percentage of accuracy throughout the entire range. With the mechanism here described the first few grams could be read to $\tfrac{1}{10}$ gram or better than 1% accuracy while in the upper portion of the scale $\tfrac{1}{10}$ millimeter would represent perhaps 100 grams, again with 1% accuracy.

Forming part of the mechanism to be used when it is desired to maintain a predetermined constant pressure between the perforated plunger 42 and the grease in the cup 40, an adjustable stop or contact arm 84 is provided, this arm being secured to a disc 86 to which disc is also secured a hub 88. The bracket 64 has a cut-out portion in which the hub 88 is fitted, the bracket thus acting as a bearing for the hub and disc 86. The disc 86 and hub 88 are provided with a center opening through which the cam shaft 61 passes. The hub 88 is provided with a peripheral groove 90 which cooperates with a set screw 92 to prevent longitudinal movement of the hub. Disc 86 and hub 88 are thus co-axial with the cam shaft 61 and serve to pivotally support the arm 84. The disc 86 is provided at one side with a set of threads or teeth 94 adapted to cooperate with a worm 96 on a shaft depending from and journaled in the top wall of the casing 10. The shaft containing the worm 96 is provided at its upper end with a knurled adjusting button 98 and by turning this button in the proper direction the contact arm 84 may thus be moved either clockwise or counterclockwise.

The outer end of the contact arm 84 is provided with a spring contact strip 100 secured at one end to a pin 102 on the arm 84 and normally resting against or contacting with a contact pin 104 also secured to but electrically insulated from the arm 84. A pin or projection 106 of electrically insulating material is secured to the pointer 66 in alignment with the strip 100. It will thus be seen that after the contact arm 84 has been adjusted to a predetermined position with the pin 106 holding the spring 100 away from the pin 104, if the pointer should tend to fall below the position of the arm 84, an electrical contact will be made between the spring 100 and the pin 104 to thus complete an electrical circuit to be described hereinafter. It is to be understood that the mechanism described in this paragraph is not used when a "constant rate of entry" test is being run; since in that test it is the variable pressure exerted between the plunger 42 and the grease in the cup 40 which is to be noted and recorded. When conducting the "constant rate of entry" test the arm 84 will be turned upwardly out of the range of the pointer 66.

Secured to the underside of the upper wall of the casing 10 is an arc-shaped scale supporting member 108 to which is affixed the scale 68. The scale is, of course, of a shape to correspond with the path of the outer end of the pointer 66 and may contain suitable indicia denoting the pressure exerted upon the grease in the cup or container 40.

Figure 15:
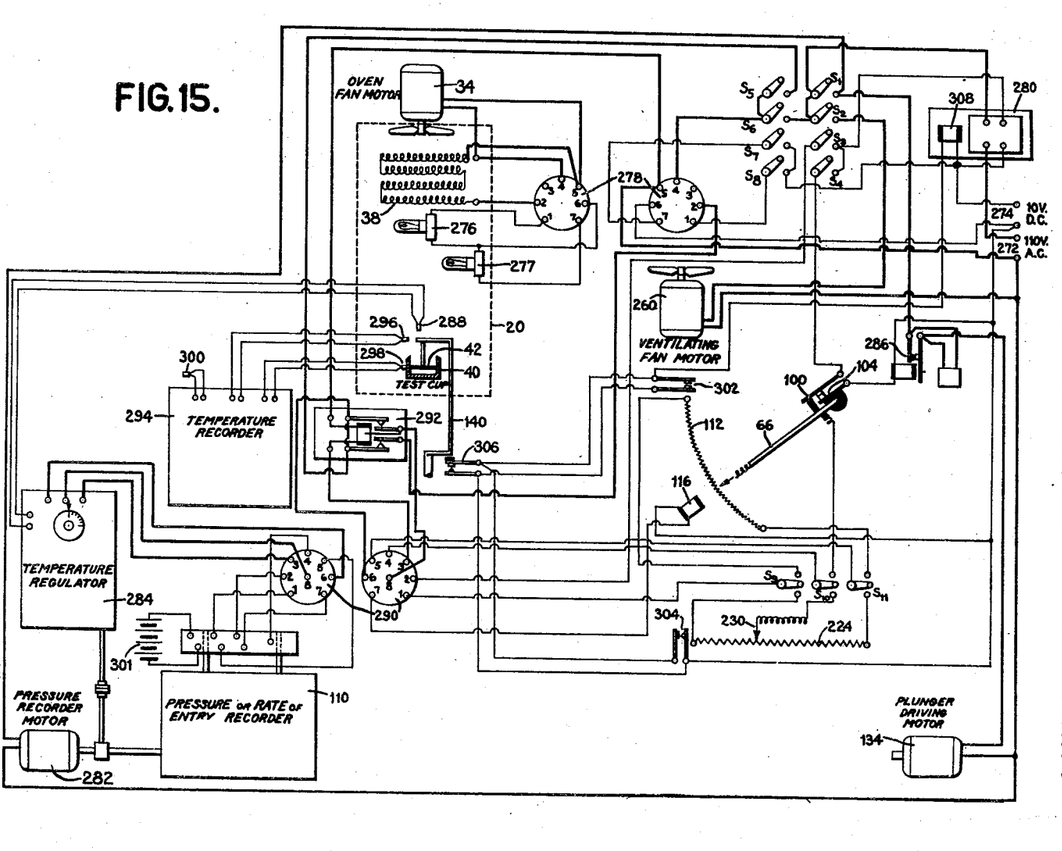
Figure 15 is a diagram of the electrical connections in which the 110 volt A. C. circuits are shown in heavy lines and the 10 volt D. C. circuits in light lines.

In order that the pressure being exerted upon the grease in the container 40 may be recorded at predetermined intervals, an arrangement is provided whereby the exact position of the pointer 66 with relation to the scale 68 may be accurately indicated on the pressure recorder 110 shown in the wiring diagram of Figure 15. As is shown in Figures 1 and 5, an electrical potentiometer 112 of the same shape as the scale 68 is mounted a slight distance from the outer edge of the scale and secured at its extremity to the plate 108. This potentiometer is preferably formed of a winding of suitable resistance wire wound upon a core of insulating material. The outer end of the pointer 66 has attached thereto a contact member 114 adapted to be forced against and to make electrical contact with the potentiometer 112.

In order to force the pointer contact 114 against the potentiometer 112 at predetermined intervals, a pair of electro-magnets 116 and an armature 118 are suitably mounted on the back of the plate 108. The armature 118 is in the form of an arm rigidly secured at one end to a shaft 120 pivotally mounted in brackets 122 attached to the plate 108. A small tension spring 124 attached to the free end of the armature and to the plate 108 normally holds the armature away from the electro-magnets 116. Rigidly secured to the ends of the shaft 120 are a pair of arms 126 having projecting fingers 128 and attached to these fingers is a curved rod 130 preferably of insulating material. The shape of the rod 130 is the same as the potentiometer 112 and as will be observed with reference to Figure 1 the rod 130 is positioned throughout its length directly in front of the potentiometer.

The particular construction of the pressure recorder 110 (Figure 15) does not form a part of the invention and it is of any suitable type containing means for energizing the electro-magnets 116 at predetermined intervals. As will be seen from the foregoing description, when the magnets 116 are energized, the armature 118 and the arms 126 will be moved in a clockwise direction, as shown in Figure 5, toward the magnets, and the rod 130 attached to the fingers 128 will engage the pointer contact 114 forcing the latter into engagement and electrical contact with the potentiometer 112. The potentiometer 112 and the pointer 66 are connected in circuit with the pressure recorder 110, the arrangement being such that each time the contact is made between the pointer 66 and the potentiometer 112, the instrument 110 will record the position of the pointer with respect to the scale 68 and thus the pressure being exerted at that particular instant on the grease in the container 40.

*Driving mechanism*

In order to force the plunger 42 into and through the grease contained in the cup 40, an electric motor 134 is mounted in the lower portion of the casing 10 and may be connected to the plunger 42 through the mechanism which will now be described.

As will be observed with reference to Figure 3, the plunger plate 42 is attached to a rod 136 which is rigidly secured to and suspended from a yoke 138. The ends of the yoke 138 are suitably attached to a pair of pull rods 140 which extend downwardly within the casing 10 and are similarly attached at their lower ends to another yoke 142 which is secured at its midpoint to the upper end of a vertically disposed screw 144. The bottom or lower wall 146 of the upper casing 16 is provided with a pair of upwardly projecting bearing guides 148 having flanged lower ends 150 for engagement with the heat insulated wall 146. The guides are secured in position by means of a pair of threaded nuts 152 and a suitable washer 154.

The bracket 52 which supports one end of the scale beam 50 is generally tubular in shape and is provided along its sides with a pair of longitudinal slots 156. As is shown in Figure 4, the tubular bracket 52 normally encloses the upper end of the screw 144 and the slots 156 serve to guide the yoke 142 in its vertical movement. An internally threaded sleeve 158 has its upper end journaled in a hub 160 depending from the partition 14 and its lower end journaled in a bracket 162 also attached to the partition 14. A threaded wheel 164 is rigidly secured to the sleeve 158 by means of suitable set screws between the bracket members 160 and 162, and between the hub of the wheel 164 and the bracket 160 is an antifriction thrust bearing 166 of the usual ball bearing type. It will be seen that the sleeve 158 is prevented from longitudinal movement and the rotation of this sleeve will, therefore, cause the screw 144 threaded therein to move up or down depending upon the direction of rotation. The lower end of the sleeve 158 is provided with a knurled disc 168 so that the sleeve may be turned manually to move the screw 144 and thus the plunger 42 up or down.

Figures 7, 8, 9, 10:
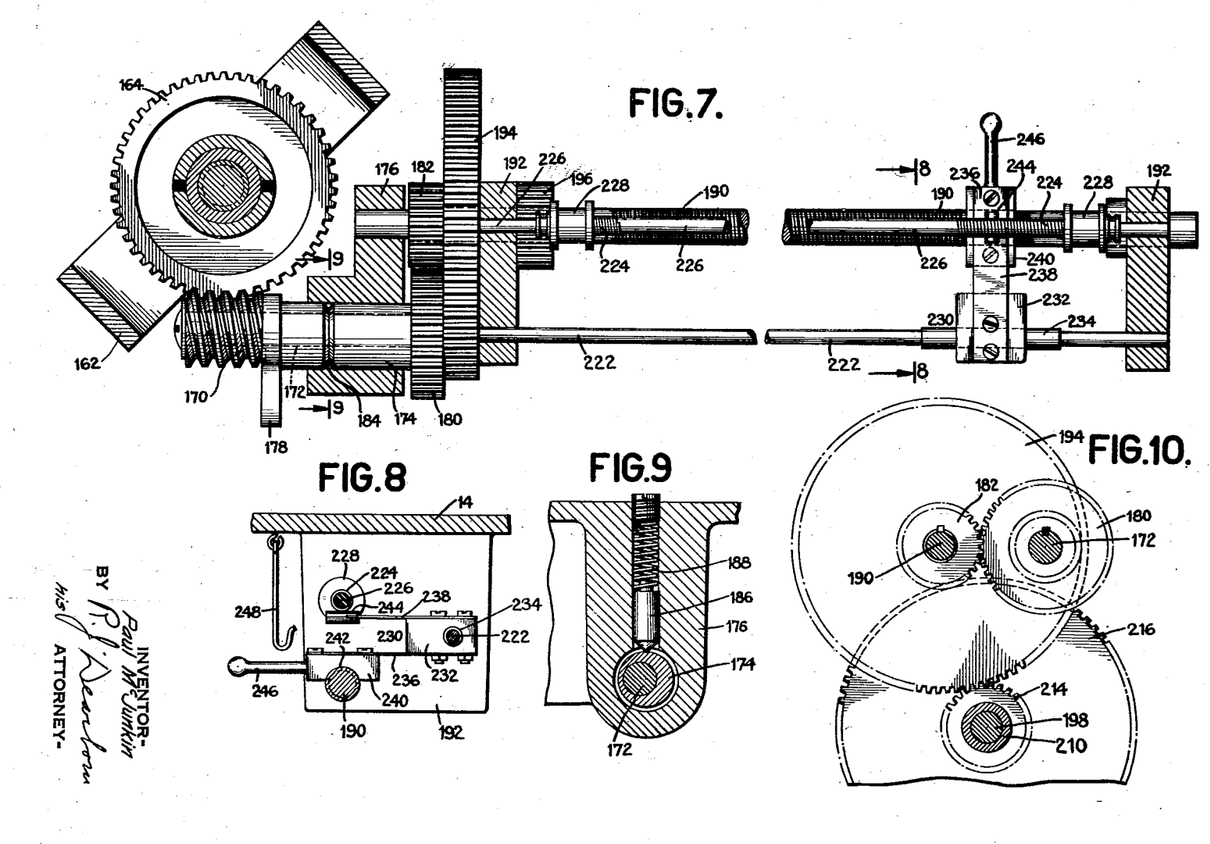
Figure 7 is a sectional plan view taken on line 7—7 of Figure 1.
Figure 8 is a sectional view of the potentiometer contacting mechanism taken on line 8—8 of Figure 7.
Figure 9 is a sectional view taken on line 9—9 of Figure 7.
Figure 10 is an elevation of part of the gearing in the driving mechanism taken on line 10—10 of Figure 1.

For rotating the wheel 164 a cooperating worm 170 is provided and, as is shown in Figure 7, the worm is mounted upon a shaft 172 journaled in an eccentric sleeve 174, which sleeve is rotatably mounted in a bracket 176 depending from the partition 14. An arm 178 is attached to the eccentric sleeve 174 and serves as a means for rotating the sleeve. The end of the worm shaft 172 opposite the worm 170 has secured thereon a gear 180, this gear normally meshing with a smaller driving gear 182. It will be seen that when the arm 178 is moved angularly the eccentric sleeve 174 will be turned and the worm 170 will be disengaged from the wheel 164 and at the same time the driven gear 180 will be separated from the driving gear 182. As shown in Figures 7 and 9 the eccentric 174 is provided with an encircling groove 184 adapted to be engaged by a small pointed plunger 186 forced against the eccentric by a compression spring 188.

When it is desired to withdraw the plunger 42 upwardly from the grease container 40 the worm 170 is disengaged from the wheel 164 in the manner set forth and the knurled disc 168 may then be turned by hand in a direction to raise the screw 144 and consequently the plunger 42. The spring pressed plunger 186 serves to hold the eccentric 174 in any position in which it may be turned by the arm 178.

The gear 182 is secured to a shaft 190, the ends of which are journaled in bearings provided in a pair of brackets 192 secured to and depending from the partition 14. Adjacent the gear 182 and secured to the shaft 190 is a larger gear 194 and on the opposite side of the left hand bracket 192 and also secured to the shaft 190 is a smaller gear 196. The shaft 190 is threaded throughout substantially all of its length between the brackets 192 for a purpose which will be described hereinafter.

The shaft 198 of the driving motor 134 is connected by means of a coupling 200 and a suitable reduction gear box 202 to one side of a clutch 204. The outer or left hand end of the motor shaft 198 is journaled in a bracket bearing 206 and affixed to the shaft at a point adjacent the bracket 206 is one side of a second clutch 208. Slidably mounted on the motor shaft 198 is a short tubular shaft 210 and secured to one end of this shaft is the other half of the clutch 204. Affixed to the other end of the shaft 210 is the other half 212 of the second clutch. Also secured to the shaft 210 are a pair of gears 214 and 216. A clutch lever 218 pivotally mounted at its lower end on the wall 12 of the casing 10 is provided with a pin 220 adapted to engage in a groove, not shown, in the clutch member 212. A pin 221 cooperating with a pair of holes in a bracket 223 is adapted to hold the lever 218 in either of its extreme positions. In the view shown in Figure 1 the lever 218 is in its left hand position with the clutch members 208 and 212 engaged and the small gear 214 meshing with the larger gear 194. The motor 134 will thus rotate the gear 194 and through the gearing shown in Figure 10 the shaft 172 will also rotate, thus driving the worm 170 and worm wheel 164. As has been explained hereinbefore the rotation of the worm wheel 164 will cause the perforated plunger 42 to be lowered into and through the grease contained in the cup 40.

*Mechanism for maintaining a constant pressure on the grease being tested*

In case it is desired to run a "constant pressure" test the mechanism now to be described will be utilized. As will be observed with reference more particularly to Figures 7 and 8, a rod 222 is mounted between and has its ends secured in the brackets 192, the rod 222 forming a support for a slider shown in Figure 8. Also supported by and mounted between the brackets 192 is a potentiometer 224, this device preferably comprising a winding of bare electrical resistance wire on a rod 226 and being similar, electrically, to the potentiometer 112 described previously. The potentiometer resistance is, of course, suitably insulated from the rod 226, providing the latter is metallic, and the ends of the winding are secured in place by means of suitable clamps 228.

The slider shown generally at 230 in Figure 8 consists of an insulated block 232 having mounted transversely therethrough a short tube 234. The tube 234 fits closely upon and is adapted to slide along the supporting rod 222. The insulating block 232 has attached thereto a pair of spring arms 236 and 238, the outer or free end of the arm 236 having attached thereto a split nut 240, this member being threaded at 242 to engage the aforementioned threads on the shaft 190. The free end of the spring arm 238 has attached thereto an enlargement 244 adapted to press against and form electrical contact with the potentiometer winding 224.

From the foregoing description it will be seen that as the shaft 190 revolves, the split nut 240 and consequently the entire slider 230 will move along the guide rod 222 and an electrical contact will be made between the spring arm 238 and the potentiometer 224 in all positions. The split nut 240 is preferably provided with an extension arm 246 which may be raised by hand and held by a hook 248 attached to the partition 14. Thus the split nut 240 may be disconnected from the revolving shaft 190 when a "constant pressure" test is not being conducted.

*General features*

In the operation of the grease testing machine it is of course essential, as has been pointed out hereinbefore, that the walls of the heating chamber 20 be well insulated so that the temperature therein may be controlled accurately. It is also essential that the temperature within the casing 10 be maintained fairly constant and in order that heat from the chamber 20 may be prevented from entering the casing 10 through the upper wall thereof, the casing 16 is separated from the casing 10 by means of an air chamber 250. The casing surrounding the air chamber 250 is provided with a plurality of openings 252 and a plurality of vent pipes 254 leading downwardly from the chamber 250 lead to a duct 256 opening into a fan chamber 258 attached to the upper wall of the casing 10. An electric motor 260 suspended from the casing 258 serves to drive an exhaust fan, not shown, within the chamber 258. The motor 260 in driving the exhaust fan draws air at atmospheric temperature into the chamber 250 through the openings 252 and into the fan chamber 258 through the pipes 254 and the duct 256. The air is then blown out of the chamber 258 through an opening 262 in the back wall of the casing 10. Thus, by constantly drawing air at room temperature into the chamber 250 the possibility that heat may pass downwardly from the chamber 20 into the casing 10 is rendered substantially negligible.

*Electrical connections and operation*

With reference to the wiring diaphragm comprising Figure 15 of the drawings it will be seen that there are two main circuits, first, a 110 volt alternating current circuit having its source at 272 and, second, a 10 volt direct current circuit having its source at 274. The 110 volt A. C. circuit includes, of course, the plunger driving motor 134, the oven fan motor 34, the ventilating fan motor 260 and the heating unit 38 in the oven chamber, while the 10 volt D. C. circuit includes the control equipment such as certain relays and other contact devices to be explained.

The enclosure designated by the dotted line indicates the heating or oven chamber 20 and within this chamber will be observed the fan of the motor 34, the heating element 38, a pair of small electric lamps 276 and 277, as well as the grease container or test cup 40 and its associated plunger 42. The driving connection for the plunger 42 is indicated diagrammatically by the rod 140. The oven fan motor 34 is shown as connected through the multi-point plug switch 278, the switch S6 and a circuit breaker 280 to the 110 volt A. C. line. The lamps 276 and 277 which are used for lighting the interior of the chamber 20 so that the grease may be viewed through the tube 47 (Figure 1), are connected to the source 274 through the multi-point plug switch 278, switches S7 and S8, and the circuit breaker 280 which is also connected in the 10 volt D. C. circuit. The ventilating fan motor 260 is connected in the 110 volt A. C. circuit through the switch S2 and the circuit breaker 280. The plunger driving motor 134 and a motor 282 which serves to drive the pressure recorder 110 and the temperature regulator 284 are connected in the 110 volt A. C. circuit through the switch S1 and the circuit breaker 280, the plunger driving motor 134 also having in its circuit the relay switch 286, the operation of which will be explained hereinafter.

Connected to the temperature regulator 284 is a thermocouple 288 located within the oven chamber 20. The temperature regulator 284 is also connected through the multi-point plug switch 290 to the energizing coil of a relay 292 which relay is connected to the heating element 38 in the oven chamber 20. The purpose of the multi-point plug switches 278 and 290 is to make it easier to assemble and disassemble the apparatus. Switch 278 is placed in the connections to the heating or oven chamber 20 and the switch 290 is located in the connections to the temperature regulator 284 and the pressure or rate of entry recorder 110. It is understood, of course, that one half of each of these switches is provided with prongs which fit within correspondingly spaced openings or sockets in the other half, and the switches are disconnected merely by pulling the two halves apart. The temperature regulator is usually provided with a manually operable dial and the arrangement is such that by proper adjustment of the dial this instrument, which is responsive through the thermocouple 288 to the temperature existing in the oven chamber 20, will control the energization of the heating element 38 so as either to maintain the temperature in the oven at a predetermined fixed point or to increase or decrease the temperature therein at a predetermined uniform rate.

A temperature recorder 294 has connected thereto a thermocouple 296 responsive to the temperature in the oven chamber 20; a thermocouple 298 attached to the grease container 40 so as to be responsive to the temperature of the grease therein and a thermocouple 300 which is located outside of the machine so as to indicate the temperature of the room in which the machine is being operated. The pressure recorder 110, the temperature regulator 284 and the temperature recorder 294 are all instruments which may be purchased in the market and their construction, therefore, forms no part of this invention. The pressure recorder 110 and the temperature recorder 294 are of the type in which a paper chart is caused to move past a suitable pen or other marking device at a predetermined uniform speed. The charts showing the amount of pressure exerted between the plunger 42 and the grease in the cup 40 and the amount or rate of entry of the plunger into the grease cup are made directly on the pressure or rate of entry recorder 110 while the temperatures indicated by the thermocouples 296, 298 and 300 are plotted on a chart by the temperature recorder 294. A storage battery or dry cells 301 are connected to the pressure or rate of entry recorder 110 and serve as a current supply for the circuits including the magnets 116 and the potentiometers 112 and 224.

A plurality of electrical contact devices are mounted in the testing machine and are connected to a circuit breaker 280. One of these contact devices 302 is shown in Figure 15 as being mounted adjacent the upper end of the potentiometer 112 in a manner such that in the event that the pressure exerted by the plunger 42 on the grease in the cup 40 should become so great that the pointer 66 of the scale mechanism should tend to move past the end of the potentiometer 112, the pointer will engage and close the contacts. Another contact device 304 is mounted near the end of the potentiometer 224 for a like purpose, i. e., so that in case the slider 230 should move to the extreme left hand end of the potentiometer the contact will be closed. Still another similar contact device 306 is shown diagrammatically as mounted in a position to be actuated by the plunger driving mechanism 140 when the plunger has reached the bottom of the cup 40. The contact devices 302, 304 and 306 are connected in circuit with the magnet coil 308 of the circuit breaker 280 and should any one of these contact devices be actuated to close as described the circuit breaker 280 will open, thus stopping the plunger driving motor 134 and all of the other electrically driven apparatus.

A plurality of two-way single-throw switches S9, S10 and S11 are connected in the circuits of the two potentiometers 112 and 224. If these three switches are thrown to their upper position as viewed in Figure 15, the potentiometer 112 will be in circuit with the pressure recorder 110 and these conditions will obtain whenever a "constant rate of entry" test is being run, that is, when it is desired to record the pressures exerted between the plunger 42 and the grease in the cup 40 when the plunger is being moved uniformly into the cup. When the switches S9, S10 and S11 are moved to their lower position the potentiometer 224 will be connected in circuit with the pressure or "rate of entry" recorder 110, in place of the potentiometer 112, and with these connections the instrument 110 will record the amount or "rate of entry" of the plunger 42 into the grease test cup 40 when a constant predetermined pressure is being maintained between the plunger and the cup.

Let it be assumed that it is desired to run a "constant rate of entry" test or, in other words, that it is desired to determine the pressures exerted by the plunger 42 on the grease in the cup 40 while the plunger is being forced into and through the grease at a uniform rate and while at the same time the temperature within the oven chamber 20 is raised uniformly at a rate of say 1° Fahrenheit per minute. A sample of grease is cut directly from the cake that is to be tested, using the cup or container 40 to do the cutting in order that the grease to be tested may not be disturbed and to avoid any extra working of the grease. The container and grease sample are then placed on the plate 44, this plate being connected, as has been explained hereinbefore, to the sensitive scale mechanism. The temperature within the oven chamber 20 is brought up to some predetermined point, for instance, 100° Fahrenheit, by means of the temperature regulator 284, and the regulator is adjusted so that the temperature within the oven chamber will be increased at a rate of 1° Fahrenheit per minute.

The worm 170 is disconnected from the worm wheel 164 by turning the arm 178 and thus the eccentric 174 and the knurled disc 168 is turned in a direction such that the plunger plate 42 will be lowered into the grease in the cup 40 until the grease begins to feed through perforations in the plunger. The eccentric 174 is then turned so as to again bring the worm 170 and the worm wheel 164 into engagement. The switches $S_1$, $S_2$, $S_3$, $S_5$, $S_6$, $S_7$ and $S_8$ are closed and the switches $S_9$, $S_{10}$, and $S_{11}$ are moved to the upper position as viewed in Figure 15. Clutch shift lever 218 will be moved and locked in its left hand position by means of the pin 221 and the motor 134 driving through its shaft 198, the clutch members 208 and 212, the gears 214, 194, 182 and 180 will rotate the worm 170 and worm wheel 164. The rotation of the sleeve 158 will cause the screw 144 to move downwardly and thus the plunger plate 42 will be lowered into the cup 40 at a constant rate, usually a few thousandths of an inch per hour.

The force caused by the resistance of the grease to the plunger 42 will be transmitted from the platform plate 44 to the scale beam 50 and thus to the pointer 66 by means of the flexible strip 56. The pointer 66 will thus be deflected and the position of the pointer with respect to the scale 68 will indicate the amount of the force exerted by the plunger in penetrating the grease. Naturally the higher the force necessary for the plunger to pass through the grease sample, the greater will be the deflection of the indicator pointer 66. During this time the pressure recorder 110 will cause the magnets 116 to be energized periodically, preferably every few seconds, and each time the magnets are energized the pointer 66 will be pulled laterally into contact with the potentiometer coil 112 by means of the arms 126 and rod 130 shown in Figure 5. As will be observed from an inspection of the electrical diagram comprising Figure 15, the pointer 66 is also connected in the circuit of the pressure recorder 110 and thus each time the pointer contact 114 engages the potentiometer 112 the pressure recorder 110 will cause a mark to be made on the customary moving chart referred to hereinbefore. A continuous record will thus be made of the varying pressures indicated by the scale mechanism 50—66.

During the above described operation the arm 84 will have been moved upwardly and out of the range of the pointer 66. Should for any reason the pointer 66 tend to move upwardly beyond the potentiometer coil 112 or should the plunger reach the bottom of the test cup 40 the contact devices 302 or 306 respectively will be closed, thus opening the circuit breaker 280 and stopping the plunger driving motor. During all of the operation so far described the fan motor 260 will draw air into the chamber 250 and exhaust the same from the casing 10 through the opening 262 in order to prevent the transfer of heat from the oven chamber 20 to the interior of the larger casing where such heat might affect the instruments to cause them to register improperly. Even temperature distribution within the oven chamber 20 is maintained by the fan driven by the motor 34.

Figure 12:
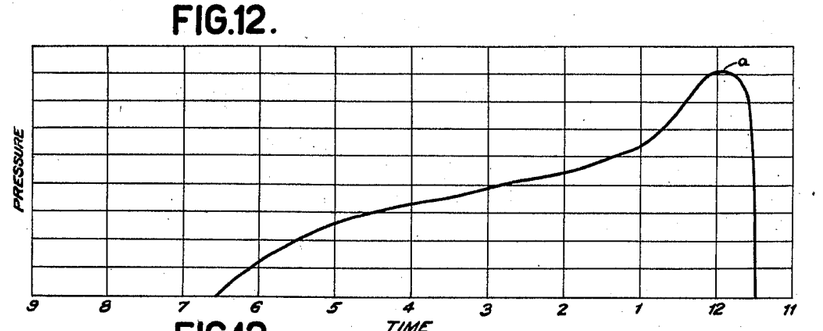
Figures 12, 13 and 14 are typical curves as plotted by the grease testing machine.

A chart illustrating the test described in the foregoing paragraphs is shown in Figure 12 of the drawings. This chart is to be read from right to left, the pressures measured by the instrument 110 being indicated along the vertical axis while time is measured along the horizontal axis. It will be obvious from this chart that at the beginning of the test the pressure on the grease increased rapidly for a comparatively short time up to the point marked "a", after which the grease became softer due to the increase in temperature within the oven chamber 20. The pressures on the grease then decreased gradually until such a temperature was reached that the grease flowed through the plunger 42 at zero pressure indicating the end of the run.

Let us now assume that it is desired to run a "constant pressure-increasing temperature" test. The sample of grease is cut and placed on the platform plate 44 in the same manner as for the "constant rate of entry" test already described. The plunger 42 is then lowered by hand until the pointer 66 registers a desired pressure of, for instance, 25 lbs. The arm 84 will then be adjusted by means of the knurled nut 98 and brought into substantial alignment with the pointer 66 when the latter is indicating the predetermined pressure, i. e., 25 lbs. The position of the arm 84 will be such that when the pointer 66 indicates a 25 lb. pressure the pin 106 on the pointer will engage the contact strip 100 secured to the end of the arm 84 holding the strip away from the contact pin 104 thus breaking the circuit to the plunger driving motor 134 as will be observed with reference to Figure 15. For this test, switch $S_3$ will be opened while $S_1$, $S_2$, $S_4$, $S_5$, $S_6$, $S_7$ and $S_8$ will be closed and the switches $S_9$, $S_{10}$ and $S_{11}$ will be moved to their lower positions so as to connect the potentiometer 224 into the circuit of the recording instrument 110 in place of the potentiometer 112.

With the connections described in the preceding paragraph the plunger driving motor 134 will not operate and, consequently, there will be no further movement of the plunger 42 into the grease in the cup 40. The clutch shift lever 218 will be moved and locked in its right hand position with the clutch 204 connected and with the clutch members 208 and 212 disconnected. In this position the gear 216 will mesh with the gear 196. As was the case in the previously described test, the temperature regulator 284 will be adjusted to increase the temperature in the oven chamber 20 at a uniform rate of 1° Fahrenheit per minute. The slider arm 246 will be disengaged from the hook 248 and the split nut 240 allowed to mesh with the shaft 190, and therefore any rotation of the shaft 190 will cause a movement of the slider contact 244 along the potentiometer 224. The pressure between the plunger 42 and the grease in the cup 40 will remain constant until the temperature has been increased sufficiently for some of the grease to feed through the perforations in the plunger and as soon as this happens the pressure will drop and the pointer 66 will move downwardly to indicate a lower pressure. When this occurs the pin 106 will move away from the contact strip 100 allowing an electrical contact to be made between that strip and the pin 104.

As will be observed with reference to Figure 15, when a contact is made between the elements 100 and 104 the relay 286 will be actuated and the plunger driving motor 134 will be connected in the 110 volt A. C. circuit. The motor 134 acting through the clutch 204 and the gears 216 and 196 will cause the screw 144 to lower the plunger 42 into the grease, thus again increasing the pressure. As soon as the pressure has been brought up to the desired amount, i. e., 25 lbs., the pin 106 on the pointer 66 will again open the electrical circuit between the contact elements 100 and 104 thus causing the relay 286 to disconnect the plunger driving motor 134 from the circuit. The pressure will, in all probability, remain at this amount until a time when the temperature within the oven chamber 20 has again increased sufficiently to cause more of the grease to pass through the perforations in the plunger 42. At this point the pressure will again drop and the motor 134 will be again connected in the circuit so as to once more bring the pressure back to the predetermined amount. These periods when the motor 134 operates to lower the plunger will become increasingly more frequent until a point is reached when the grease will flow freely through the perforations in the plunger after which the test will be stopped. Should the slider 230 be moved toward the left so far as to reach the end of the potentiometer 224 the contact device 304 shown in Figure 15 will be actuated to open the circuit and thus stop the driving motor 134 as has been previously described.

Figure 13:
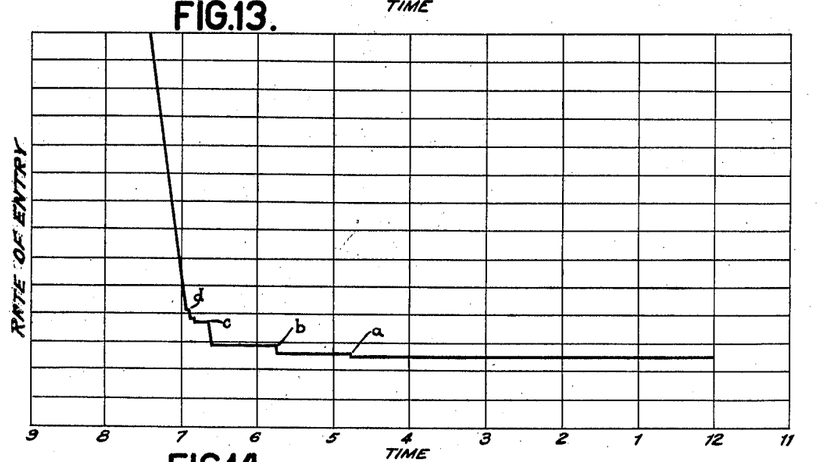

The chart shown in Figure 13 illustrates the test just described and it will be observed that the curve remains horizontal from the starting point to the point "a", this period denoting the time elapsing between the start of the test and the time when the motor 134 is first connected to bring the pressure back to the desired amount. At the point "a" the curve is substantially vertical for a very small distance during which time the motor 134 was operating. Beyond the point "a" the curve is horizontal thus denoting that the pressure was again at the desired amount of 25 lbs. At the points "b" and "c" the curve is again substantially vertical and starting at the point "d" the curve rises abruptly for a considerable distance thus indicating that the motor 134 was running continuously while the grease flowed freely through the plunger 42.

Figure 14:
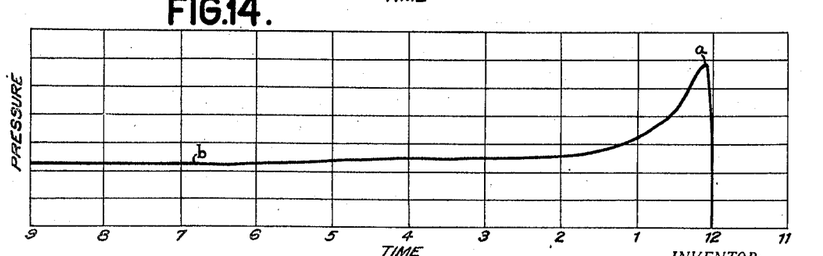

Figure 14 is a chart typical of a "constant temperature-maximum initial pressure" test. This test is run in a manner quite similar to the "constant pressure-increasing temperature" test but with the temperature within the oven chamber 20 maintained at a predetermined point by means of suitable adjustment of the temperature regulator 284. The motor 134 remains inoperative throughout the duration of the test and the potentiometer 112 is again connected in the circuit of the pressure recorder 110 by moving the switches S₉, S₁₀ and S₁₁ to their upper positions. The switches S₁, S₂, S₃, S₅, S₆, S₇ and S₈ will be closed while the switch S₄ may remain open. The plunger 42 will be lowered manually into the grease in the cup 40 until a predetermined maximum pressure is indicated by the pointer 66, the arm 84 being adjusted so that the pin 106 on the pointer will engage the spring 100 to maintain open the contact at 104 (Figure 15). The point "a" on the curve in Figure 14 indicates this point of initial maximum pressure. The grease is allowed to feed through the plunger plate 42 while the temperature in the oven chamber remains constant as has been already stated. The pressure will in all probability drop rather rapidly at first and will then continue to fall more gradually until it reaches a point such as indicated at "b" on the curve after which the flow of grease through the plunger becomes zero, the pressure thereafter remaining constant. The point "b" will thus represent the yield point of the sample at the temperature at which the test is run.

It will be obvious that the machine can be utilized for conducting still other tests. For instance, the temperature within the oven chamber 20 may be maintained constant while the motor 134 causes the plunger 42 to be forced into the grease at a uniform rate. Again a test similar to the "constant temperature-maximum initial pressure" test previously described may be run, setting the plunger for a maximum initial pressure but maintaining the oven chamber 20 at room temperature rather than at some fixed higher or lower temperature.

Obviously, many modifications and variations of the invention, as hereinbefore set forth, may be made without departing from the spirit and scope thereof, and therefore only such limitations should be imposed as are indicated in the appended claims.

I claim:

1. In a lubricant testing machine, a container for a lubricant, a perforated plate of substantially the same area and cross section as said container, movable supporting means for said plate arranged so that said plate may enter said container to bear against and be forced into the lubricant contained therein, means for increasing the temperature of said lubricant at a predetermined uniform rate, means for driving said plate into the lubricant in said container, means responsive to the pressure exerted on said lubricant by said plate for controlling the actuation of said driving means so as to maintain a predetermined constant pressure between said plate and said lubricant as the lubricant becomes softened, due to the increasing temperature, and measuring means connected with said driving means for indicating the rate with which said plate moves into and through said lubricant.

2. In a grease testing apparatus, a grease container comprising four side walls, a perforated plate of substantially the same area and cross section as said container, means for manually forcing said plate into the grease in said container until a predetermined pressure between said plate and said grease is obtained, means for increasing the temperature of the grease in said container at a predetermined uniform rate, means connected to said container for indicating the force exerted by said plate on said grease, means for driving said plate into the grease in said container, means operated by said indicating means for controlling the actuation of said driving means so as to maintain said predetermined pressure as the grease becomes softened due to the increasing temperature, and measuring means connected with said driving means for indicating the rate with which said plate moves through said grease.

3. In a device of the character described, a container for a lubricant, a perforated plate of substantially the same area and cross section as said container, movable supporting means for said plate arranged so that said plate may be driven into said container to bear against and be forced through a lubricant contained therein, means for increasing the temperature of said lubricant at a predetermined uniform rate, an electric motor for driving said plate into said lubricant, gearing connecting said motor and said plate supporting means, a scale mechanism connected to said lubricant container so as to be responsive to the pressure exerted by said plate upon the lubricant in said container, means associated with said scale mechanism for controlling the energization of said motor so as to drive said plate into the lubricant to maintain a predetermined constant pressure between the plate and the lubricant, and means operated by said motor for indicating the rate with which said plate moves into and through said lubricant.

4. In a device of the character described, a grease container, a perforated plate of substantially the same area and cross section as said container, movable supporting means for said plate arranged so that said plate may be driven into said container to bear against and be forced through a grease contained therein, means for increasing the temperature of said grease at a predetermined uniform rate, an electric motor for driving said plate into said grease, gearing connecting said motor and said plate supporting means, a scale mechanism connected to said grease container so as to be responsive to the pressure exerted by said plate upon the grease in said container, an electrical contact device actuated by said scale mechanism and connected in the circuit of said motor, the arrangement being such that said motor will be energized to drive said plate into said container to maintain a predetermined pressure between the plate and the grease as the grease becomes softened due to the increasing temperature, and measuring means operated by said motor for indicating the rate with which said plate moves into and through said grease.

5. In a lubricant testing machine, a container for a lubricant, a perforated plate of substantially the same area and cross section as said container, movable supporting means for said plate arranged so that said plate may enter said container to bear against and be forced into the lubricant contained therein, means for increasing the temperature of said lubricant at a predetermined uniform rate, an electric motor for driving said plate into the lubricant in said container, gearing between said motor and said plate supporting means, means responsive to the pressure exerted by said plate on said lubricant for periodically energizing said motor to advance the plate to maintain a predetermined pressure between the plate and lubricant, and measuring means for indicating the rate of entry of said plate into said lubricant, said measuring means comprising a threaded shaft rotated by said motor, an elongated electrical potentiometer mounted in parallel relation to said shaft, a slider threaded to said shaft and having sliding electrical contact with said potentiometer, the rotation of said shaft by said motor causing said slider to advance along and in contact with said potentiometer, and a recording device connected in circuit with said slider and said potentiometer and responsive to the resistance of said potentiometer as varied by the contact with said slider.

6. In a grease testing machine, a container for a grease, a perforated plate of substantially the same area and cross section as said container, movable supporting means for said plate arranged so that said plate may be driven into said container to bear against and be forced through a grease contained therein, means including an electric motor for driving said plate into said grease, means for increasing the temperature of said grease at a predetermined uniform rate, a scale mechanism for continuously indicating the pressures exerted by said plate on said grease, said scale mechanism comprising a scale beam pivotally supported at one end by a fixed bracket, a graduated scale, a pointer associated with said scale, connections between the other end of said beam and said pointer, connection between said grease container and said scale beam, an electrical contact device mounted in the path of said pointer and connected in the circuit of said motor, said contact device being actuated when said pointer moves from a predetermined fixed position to close the said motor circuit so as to advance said plate into the grease, thereby maintaining a predetermined pressure between said plate and said grease as the grease becomes softened due to the increasing temperature.

7. In a grease testing apparatus in which a plunger is adapted to be forced into a cup containing a sample of a grease to be tested, an electric motor for driving said plunger into said cup, mechanical connections between said motor and said plunger, said connections including a shaft driven by said motor, a second shaft, gearing between said motor shaft and said second shaft, a vertically disposed, longitudinally movable, non-rotatable screw, a rod attaching the upper end of said screw to said plunger, a rotatable sleeve surrounding and threaded to said screw, means for maintaining said screw in a fixed position with respect to its longitudinal axis, a worm and wheel connection between said sleeve and said second shaft comprising a worm wheel secured to said sleeve and a worm secured to said second shaft, and means for disengaging said worm and wheel connection comprising an eccentric bearing for said second shaft and means for manually turning said eccentric bearing so as to move said second shaft and the worm attached thereto away from said worm wheel.

8. In a grease testing apparatus in which a plunger is adapted to be forced into a cup containing a sample of the grease to be tested, said cup being mounted on a scale mechanism for indicating the pressures exerted by said plunger on said grease, a heat insulated casing forming a chamber in which said plunger and said grease cup are mounted, a second casing enclosing said scale mechanism, means for electrically heating said chamber, an electric fan mounted in said chamber for circulating the air therein, a third casing forming an air chamber between said heat insulated casing and said second casing, said third casing being provided with openings through which air may be drawn into said air chamber, an outlet conduit connected to said air chamber and an exhaust fan connected to said outlet conduit, the arrangement being such that said exhaust fan will draw air continuously into said air chamber through said openings and out of said air chamber through said conduit so as to prevent heat from being transferred from said first mentioned chamber to the interior of said second casing.

9. A grease testing machine comprising a plurality of heat insulated walls enclosing a heating chamber, a grease containing cup in said chamber, a perforated plunger of substantially the same area and cross section as said grease cup, movable mounting means for said plunger, means for moving said plunger downwardly into and through the grease in said cup at a uniform rate, means for heating said chamber comprising an electrical resistance element wound in the form of a spiral and mounted in the upper portion of said chamber, heat resistant elements for supporting said resistance spiral, an electric fan disposed within said resistance spiral, a cylindrical wall depending from said heating element and surrounding said plunger and said grease cup, the arrangement being such that rotation of said fan will force air outwardly through said resistance element, downwardly around the outside of said cylindrical wall and then around said grease cup and upwardly through the interior of said wall.

10. In a grease testing apparatus, a grease container comprising side walls, one open edge of said container being beveled to serve as a knife in cutting a sample of grease, a perforated plate of substantially the same area and cross section as said container, means for forcing said plate into said container through the grease contained therein, the periphery of said plate being beveled to form a sharp edge so as to reduce friction between said plate and the interior surface of said container, and means connected to said container for indicating the force exerted by said plate on said grease.

11. In a grease testing apparatus, a grease container comprising side walls, one open edge of said container being beveled to serve as a knife in cutting a sample of grease, a perforated plate of substantially the same area and cross section as said container, means for forcing said plate into said container through the grease contained therein, the periphery of said plate being beveled to form a sharp edge so as to reduce friction between said plate and the interior surface of said container, a scale mechanism connected to said container for indicating the force exerted by said plate on said grease, and means for increasing the temperature of the grease in said container at a predetermined uniform rate.

12. A grease testing machine comprising a plurality of heat insulated walls enclosing a heating chamber, a grease containing cup in said chamber, a perforated plunger of substantially the same area and cross section as said grease cup, movable mounting means for said plunger, means for moving said plunger downwardly into the grease in said cup, means for cooling said chamber, said means including a coil of tubing through which a refrigerating medium may be circulated, said tubing being mounted in the upper portion of said chamber, an electric fan disposed in the upper portion of said chamber, a cylindrical wall mounted vertically in said chamber and surrounding said plunger and said grease cup, the arrangement being such that rotation of said fan will force air outwardly past said cooling coil, downwardly around the outside of said cylindrical wall and then around said grease cup and upwardly through the interior of said wall.

13. In a device of the class described, a receptacle adapted to contain a plastic material to be tested, a perforated plate of substantially the same cross section as the interior of said receptacle, means for forcing said plate into said receptacle through the plastic material contained therein, the periphery of said plate being provided with a sharpened edge so as to reduce friction between said plate and the interior surface of the receptacle, and means connected to said receptacle for indicating the force exerted by said plate in passing through said plastic material.

14. In a grease testing apparatus, a grease container comprising side walls, one open edge of said container being beveled to serve as a knife in cutting a sample of grease, a perforated plate of substantially the same area and cross section as said container, means for forcing said plate into said container through the grease contained therein, and means connected to said container for indicating the force exerted by said plate on said grease.

PAUL McJUNKIN.